Figure 10:
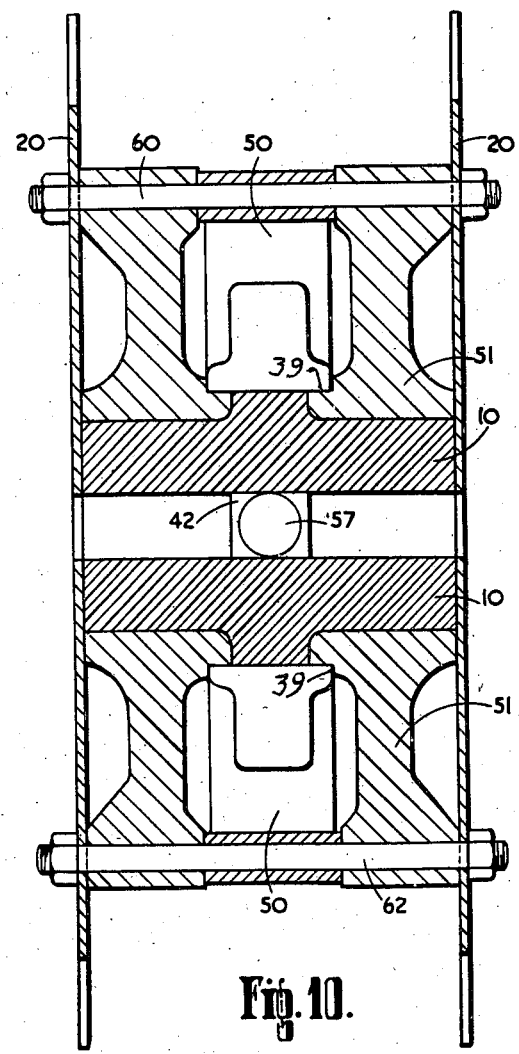

June 14, 1949.　　　　B. TEBB　　　　2,473,228
TOOL FOR INSERTING FASTENERS IN MACHINE BELTING
Filed Jan. 21, 1947　　　　　　　　　　5 Sheets-Sheet 1
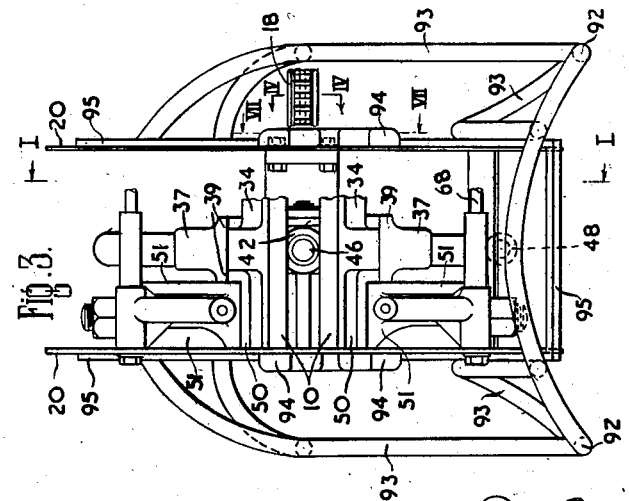
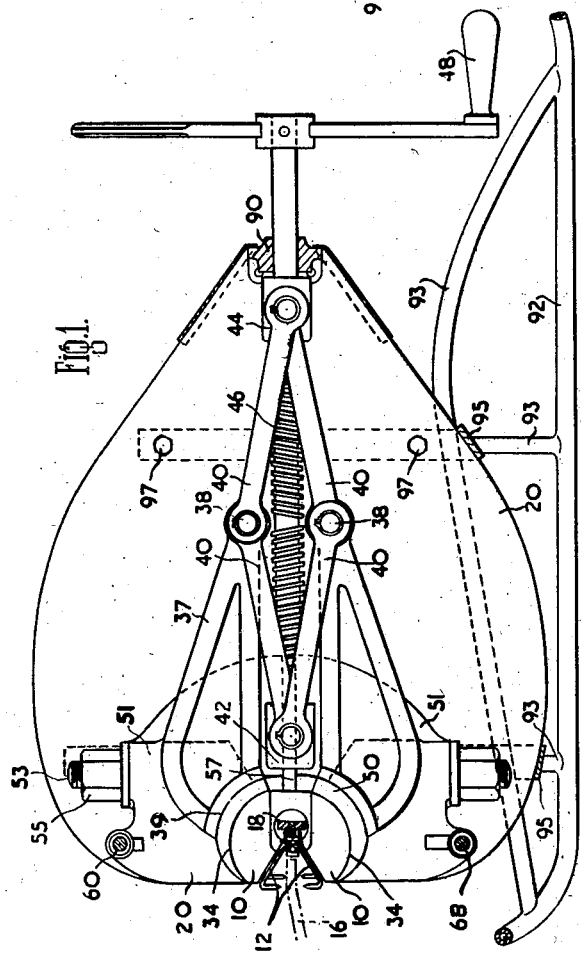
Bernard Tebb
INVENTOR
BY
S. Victor Armstrong
Attorney June 14, 1949.  B. TEBB  2,473,228
TOOL FOR INSERTING FASTENERS IN MACHINE BELTING
Filed Jan. 21, 1947  5 Sheets-Sheet 2
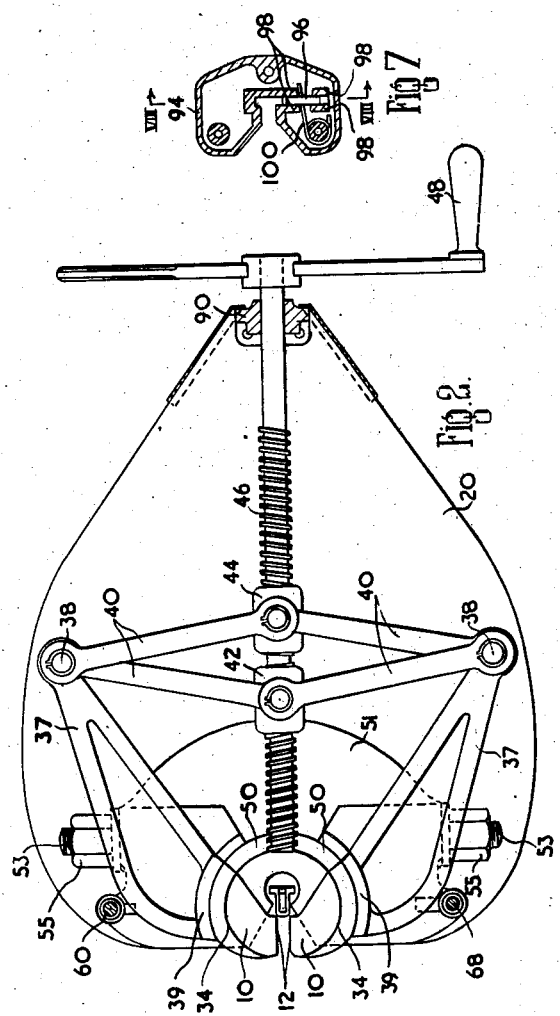

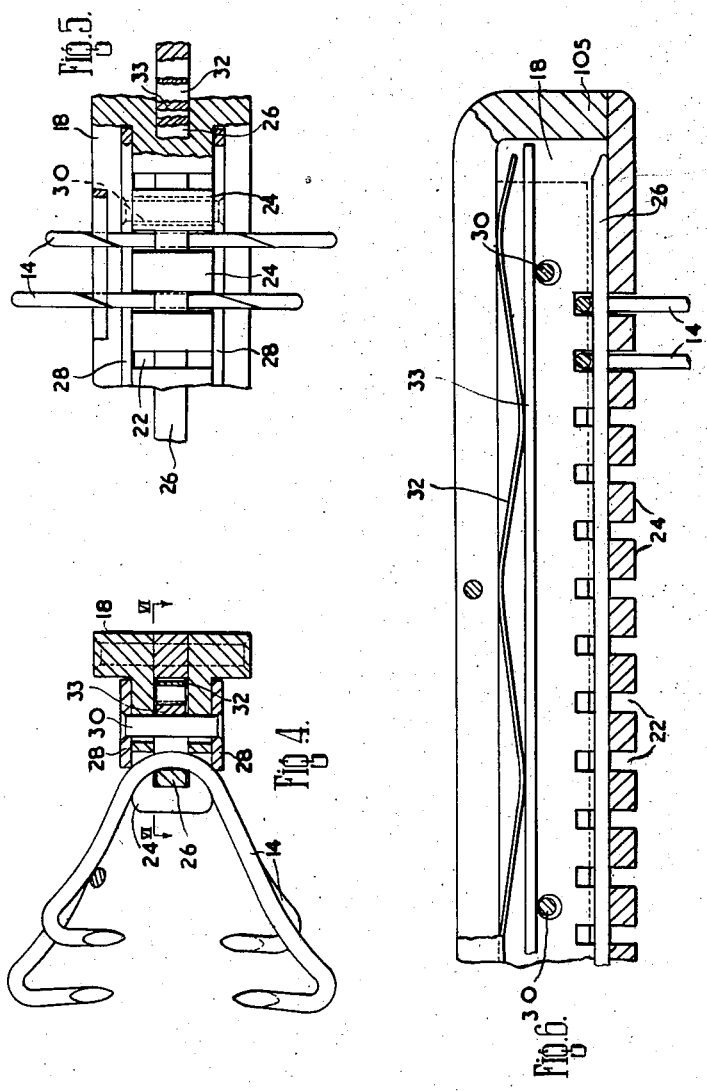

June 14, 1949.  B. TEBB  2,473,228
TOOL FOR INSERTING FASTENERS IN MACHINE BELTING
Filed Jan. 21, 1947  5 Sheets-Sheet 4
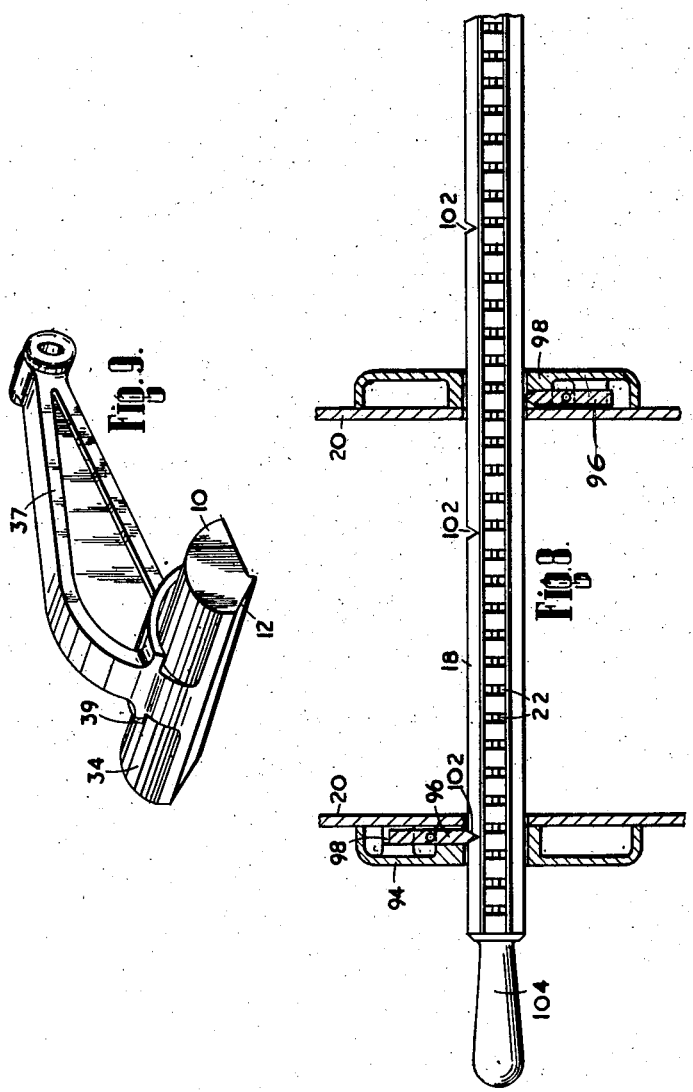
Bernard Tebb
INVENTOR
BY
S. Victor Armstrong
Attorney June 14, 1949.  B. TEBB  2,473,228
TOOL FOR INSERTING FASTENERS IN MACHINE BELTING
Filed Jan. 21, 1947  5 Sheets-Sheet 5

INVENTOR.
Bernard Tebb
BY John J. Victor Armstrong
ATTORNEY

Patented June 14, 1949

UNITED STATES PATENT OFFICE 2,473,228

TOOL FOR INSERTING FASTENERS IN MACHINE BELTING

Bernard Tebb, Hull, England, assignor to Mastabar Belt Fastener Company Limited, Cleckheaton, England Application January 21, 1947, Serial No. 723,386
In Great Britain September 13, 1938

Section 1, Public Law 690, August 8, 1946
Patent expires September 13, 1958

3 Claims. (Cl. 1—49.4)

This invention is concerned with the insertion in driving belts of wire hook fasteners which consist of a row of U-shaped wire elements having their sharpened extremities turned inwards to form teeth which penetrate the belt, each end of the belt being provided with a row of such elements the loops of which interlace with one another and are connected by a pivot pin. The expression "driving belts" is to be understood to include conveyor belts as well as those used only for the transmission of power.

The kind of inserting tool to which the invention relates comprises two jaws operated by levers or cams, these jaws engaging the limbs of the fastener from opposite sides and being approached together to force the teeth into the belt, the loops of the fastener being located by a comb-like member during the insertion operation. It has been proposed to provide the jaws with cylindrical outer surfaces sliding in segmental bearings capable of being adjusted towards and away from one another, the jaws being maintained in contact with the bearings by means of springs and being operated by means of a pair of toggle links.

According to the present invention the jaws are maintained positively in contact with the bearing surfaces by means of overhanging shoulders on the jaws having inwardly facing arcuate surfaces cooperating with similarly curved outwardly facing arcuate surfaces on the bearing members, these cooperating surfaces being concentric with the bearing surfaces themselves. Thus, the jaws are positively constrained to swing about the axes of the bearing surfaces and the correct bending of the limbs of the fasteners is ensured.

According to a further feature of the invention the jaws are actuated by means of a double toggle, that is to say, two pairs of toggle levers jointed together in the form of a quadrilateral, means such as a right and left hand threaded screw being employed for moving two opposite joints towards and away from one another, this arrangement having the important advantage that the stresses set up in the parts of the apparatus by the closing movement are much less than they are when a single pair of toggle levers is employed.

According to another feature of the invention the loops of the fastener are housed in the spaces between projections or lugs on a metal bar, these lugs being formed with holes for the reception of a rod which engages the inner sides of the loops, and the outer sides of the loops are engaged by two members one on either side of the median plane of the fastener which are urged into engagement with the loops by a stiff spring. Thus, the loops are held without backlash and cannot become distorted or displaced while the teeth are being driven into the belt.

Referring to the accompanying drawings:

Figure 1 is a side elevation of a tool according to this invention, partly in section on the line I—I in Figure 2, parts being broken away to show the construction more clearly, Figure 2 is a view similar to Figure 1 showing the jaws closed, Figure 3 is a front elevation of Figure 1, parts being broken away to show the construction more clearly, Fig. 4 is a side elevation in cross section on the line IV—IV of Fig. 3, on an enlarged scale, of the fastener holding device, showing a fastener in position, Fig. 5 is a fragmentary front elevation corresponding to Fig. 4, Fig. 6 is a sectional plan view taken approximately on the line VI—VI of Fig. 4, Fig. 7 is a detail sectional view of a guide plate on the line VII—VII of Fig. 3, Fig. 8 is a part sectional elevation on an enlarged scale taken on a corresponding line VIII—VIII of Fig. 7, showing the location of the guide plate in relation to the feed bar, Fig. 9 is a detail in perspective of one of the jaws, Figure 10 is a sectional view taken through the jaw and the bearing.

Referring first to Figures 1 to 6, the pair of jaws 10 extend horizontally one above the other and present flat surfaces 12 inclined at the same angle as the limbs of the fastener 14. These surfaces diverge towards the front of the tool and the end of the belt 16 is inserted in the gap between them. At the back of this gap is situated the fastener holding device which consists of a bar 18 extending at least the full length of the jaws and held in place by side plates 20. When the belt to be fastened is wider than the length of the jaws, the bar 18 is arranged to slide lengthwise in the side plates 20. Thus a tool having jaws twelve inches long, for example, can be made to apply fasteners to a belt as much as thirty-six inches wide.

The bar 18 has slots 22 in its front edge having the same spacing as the loops of the fasteners and the lugs or projections 24 formed by the slots are perforated to receive a pin or rod 26 which, when the fasteners 14 are inserted in the slots, is threaded through the holes so as to retain the fasteners, as clearly shown in Figures 4, 5 and 6.

Two metal strips 28, one above the bar and the other below it, are connected together by vertical pins 30 which extend through oversize holes in the bar 18. Behind the pins is a stiff leaf spring 32 bent to the wave-like shape shown in Figure 6 so as to press the pins 30 forwards, a bar or strip 33 being interposed as shown. The front edges of the strips 28 are thus pressed against the outer sides of the loops of the fastener 14 at equal distances above and below the median plane of the fastener.

Each jaw 10 has a cylindrical outer surface 34, the axis of which is situated at or near the points at which the plates 28 abut against the loops of the fasteners, this being the point at which the straight parts of the limbs of the fastener merge into the loop part extending around the pin 26. This is the point about which the limbs of the fasteners are to bend.

Each jaw 10 carries at its middle a lever 37 which is integral with the jaw. These two levers extend rearwardly and are pivotally connected to the middle joints 38 of two pairs of toggle levers 40 which are connected to two nuts 42, 44, threaded on a horizontal right-and-left hand threaded screw 46 extending from front to rear of the tool and provided with a handle 48 at its rear end. By rotating this screw the nuts 42, 44, may be caused to approach one another, thereby forcing apart the joints 38 of the toggle levers and the rear ends of the levers 37 connected to these joints.

The cylindrical surfaces 34 of the jaws 10 on either side of the levers 37 fit the concave cylindrical surfaces of segmental bearings 50, of which there are four arranged symmetrically in pairs at opposite sides of the tool, one of the bearings of each pair being above the upper jaw 10 and the other below the lower jaw. Only the left-hand pair of bearings is shown in Figure 3. The right-hand pair are identical with these. The supports for the segmental bearings 50 are the same on the two sides of the tool and the ensuing description of one applies also to the other. The bearings 50 are integral with castings 51, of which there are two pairs, one on each side, and each pair is held together by means of a bolt 53 and nuts 55. When required the nuts on the bolt 53 can be slackened to release the distance piece 57, this can be removed and a fresh parallel sided distance piece 57 of differing size may be inserted between the horizontal meeting faces of the two castings 51. By providing a number of such interchangeable distance pieces of different thicknesses, the tool can be set up for a number of different belt thicknesses.

The jaws 10 are integral with the levers 37 and are maintained positively in contact with the cylindrical bearing surfaces of the bearings 50 by providing overhanging shoulders 39 on each of the levers 37, these shoulders having inwardly facing arcuate surfaces fitting similarly curved outwardly facing arcuate surfaces on the castings 51.

A device is provided for holding the bar 18 yieldingly in one of several different positions, this device being used when a fastener is being applied to a belt the width of which is a multiple of the length of the jaws 10.

Referring to Figures 3 and 9, a plate 94 is secured to the right-hand side plate 20 (as seen in Figure 3), being shaped as shown in Figure 8 to enable the bar 18 to slide freely through it. A pin 96, Figures 7 and 9 slides vertically in guides 98 (Figure 8) forming part of the plate 94 and is urged upwards by means of a spring 100. The upper end of the pin 96 is shaped to fit V notches 102, Figure 8, formed in one edge of the bar 18. The distance between successive notches 102 is equal to the length of the jaws 10. The slope of the sides of the notches is such that the pin holds the bar securely in place during the fixing of the fastener in the belt, while at the same time the operator can move the bar lengthwise by applying sufficient force to cause the pin to be cammed away from the bar against the force of the spring 100. This device facilitates the operation of inserting fasteners into a wide belt because it is not necessary to exercise care in adjusting the belt between the jaws in the direction of the width of the belt.

In Figure 3 a second plate 94 is shown at the left-hand side of the tool. The pin 96 within the second plate is in the upper half thereof and is pressed downwardly by its spring. This is to enable the bar 18 to be inserted from either side. As shown in Figure 8 the bar 18 is notched on one side only. The pin 26, Figure 8, is provided with a handle 104 at one end. This pin can be inserted into the bar 18 only at one end, namely the left-hand end in Figure 6, the right-hand end being stopped off as indicated at 105. The handle 104 is so shaped as not to pass through the aperture in either of the plates 94. This, of course, ensures that the other end of the bar is inserted first, from whichever side it is used. When it is inserted from the left-hand side as viewed in Figures 3 and 8 the notches are uppermost and engage with the pin 96 on the left-hand side. If the bar is inserted from the other side it must be turned upside down so that the notches are below and engage the pin 96 on the right-hand side.

The apparatus is supported on skids 92 made of steel tube and they form part of a supporting cradle made up of steel tubes 93 and flat strips 95 welded together, the strips 95 being secured by bolts 97 to the side plates 20, as shown in Figure 1.

In use, after the distance between the jaws has been adjusted to the thickness of the belt to be operated on, the jaws are opened by turning the horizontal threaded spindle 46 so as to bring the parts into the position shown in Figure 1, the fasteners 14 are placed in position in the slots in the bar 18 as already described. The belt is inserted between the jaws with its extremity bearing against the front edge of the bar as shown in dotted lines in Figure 1. The spindle 46 is then turned to move the nuts 42, 44 towards one another thereby spreading apart the rear ends of the levers 37. This causes the jaws 10 to turn in the segmental bearings 50 so that the flat surfaces 12 of the jaws swing about the axes of the surfaces 34, as previously explained, whereby they remain in contact with the whole length of the limbs of the fastener during the inserting operation.

I declare that what I claim is:

1. A tool for inserting fasteners in machine belting comprising in combination segmental bearings, means to set said bearings at various predetermined distances apart relatively to one another, jaws mounted to rotate in said bearings, and overhanging shoulders on said jaws having inwardly facing arcuate surfaces cooperating with similarly curved outwardly facing arcuate surfaces on said segmental bearings, said surfaces being concentric with said bearing surfaces and serving to maintain said jaws within said bearings whilst allowing their rotation in said bearings.

2. A tool for inserting fasteners in machine belting comprising in combination segmental bearings, means to set said bearings at various predetermined distances apart relatively to one another, jaws mounted to rotate in said bearings, overhanging shoulders on said jaws having inwardly facing arcuate surfaces cooperating with similarly curved outwardly facing arcuate surfaces on said segmental bearings, said surfaces being concentric with said bearing surfaces and serving to maintain said jaws within said bearings whilst allowing their rotation in said bearings, a perforated bar, lugs on said bar to receive the loops of a fastener, and a rod adapted to be received within said perforations to engage the inner side of the fastener loops below the median plane of the fasteners.

3. A tool for inserting fasteners in machine belting comprising in combination segmental bearings, means to set said bearings at various predetermined distances apart relatively to one another, jaws mounted to rotate in said bearings, overhanging shoulders on said jaws having inwardly facing arcuate surfaces cooperating with similarly curved outwardly facing arcuate surfaces on said segmental bearings, said surfaces being concentric with said bearing surfaces and serving to maintain said jaws within said bearings whilst allowing their rotation in said bearings, a perforated bar, lugs on said bar to receive the loops of a fastener, a rod adapted to be received within said perforations to engage the inner side of the fastener loops below the median plane of the fasteners, said bar having notches therein, and a spring controlled pin holding said bar temporarily in a set position.

BERNARD TEBB.

REFERENCES CITED

The following references are of record in the file of this patent:

UNITED STATES PATENTS

| Number | Name | Date |
|---|---|---|
| 19,413 | Duchamn | Feb. 23, 1858 |
| 1,689,013 | Diamond | Oct. 23, 1928 |
| 2,167,820 | Ziller | Aug. 1, 1939 |
| 2,255,855 | Matthaei | Sept. 16, 1941 |

FOREIGN PATENTS

| Number | Country | Date |
|---|---|---|
| 847,231 | France | June 26, 1939 |